(12) United States Patent
LaFevers

(10) Patent No.: US 6,922,881 B2
(45) Date of Patent: Aug. 2, 2005

(54) METHOD FOR INSTALLING AND REMOVING A CONTINUOUS TRACK DRIVE UNIT

(76) Inventor: Mark LaFevers, 7028 Shepard Mesa, Carpinteria, CA (US) 93013

( * ) Notice: Subject to any disclaimer, the term of this patent is extended or adjusted under 35 U.S.C. 154(b) by 0 days.

(21) Appl. No.: 10/304,372

(22) Filed: Nov. 26, 2002

(65) Prior Publication Data

US 2003/0159267 A1 Aug. 28, 2003

Related U.S. Application Data

(62) Division of application No. 09/809,842, filed on Mar. 16, 2001, now Pat. No. 6,654,994.

(51) Int. Cl.$^7$ ................................................ B23P 11/00
(52) U.S. Cl. ................................ 29/402.01; 29/102.03; 29/407.09; 29/407.1; 29/426.1; 29/426.5; 29/252
(58) Field of Search ......................... 29/402.01, 402.03, 29/402.08, 407.09, 426.1, 252, 407.1, 238, 426.3, 239, 426.5, 284, 450; 474/130; 254/93 R, 100

(56) References Cited

U.S. PATENT DOCUMENTS

| 3,625,046 | A | * | 12/1971 | Van Gompel | ................ | 72/202 |
| 4,279,318 | A | * | 7/1981 | Meisel, Jr. | ................ | 180/9.64 |
| 5,246,246 | A | * | 9/1993 | Kendall | ................ | 280/677 |

* cited by examiner

*Primary Examiner*—David P. Bryant
*Assistant Examiner*—Jermie E Cozart
(74) *Attorney, Agent, or Firm*—Reed Smith, LLP

(57) ABSTRACT

The present invention is a system and method to install and remove continuous track drive units on vehicles, wherein the system contains two forcing discs connected hydraulically which mimic the shape of the vehicle end idlers. A hydraulically actuated telescopic separator is positioned between the forcing discs, such that the discs may be separated or brought together. The forcing discs are aligned with the vehicle idlers to allow the continuous track unit to be easily slipped onto the vehicle idlers from the forcing discs. Conversely, when removing continuous track drive units, the forcing discs are again aligned with the vehicle end idlers, and the track is slipped off the vehicle idlers and onto the forcing discs.

11 Claims, 19 Drawing Sheets

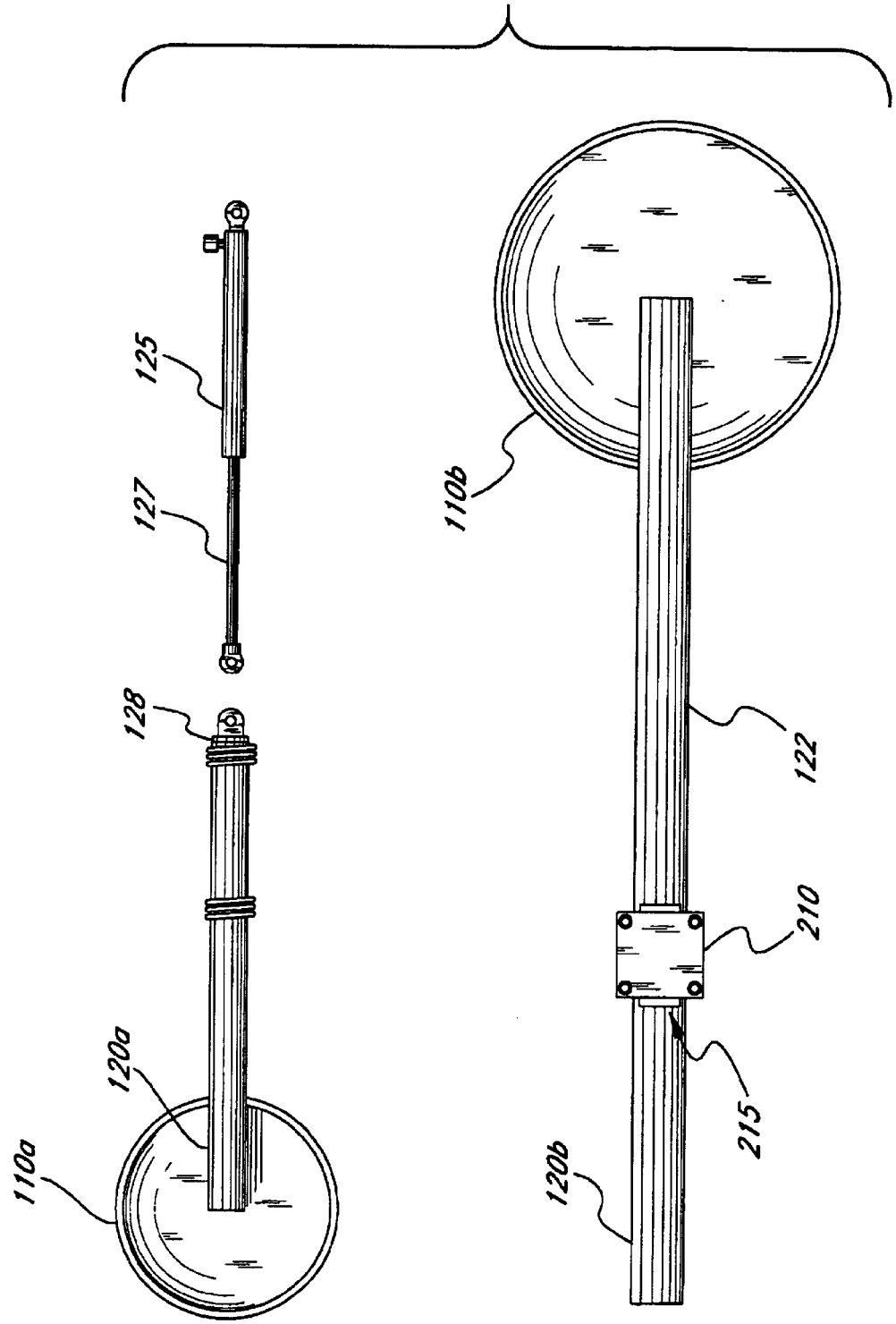

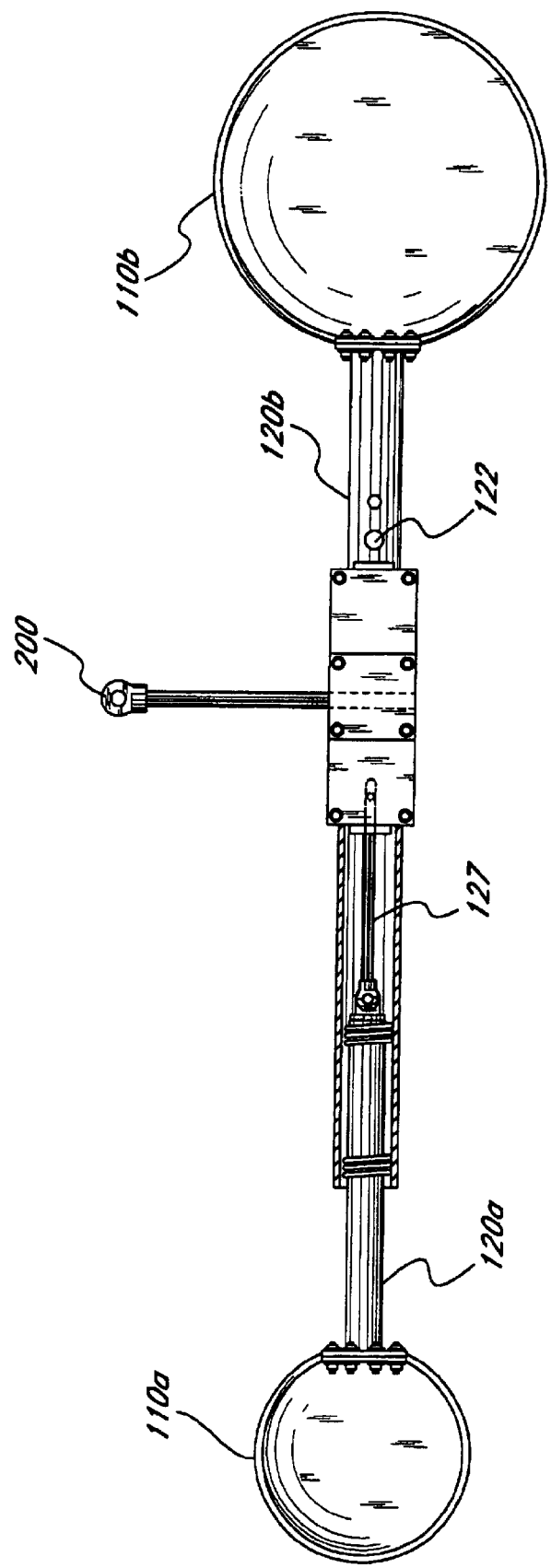

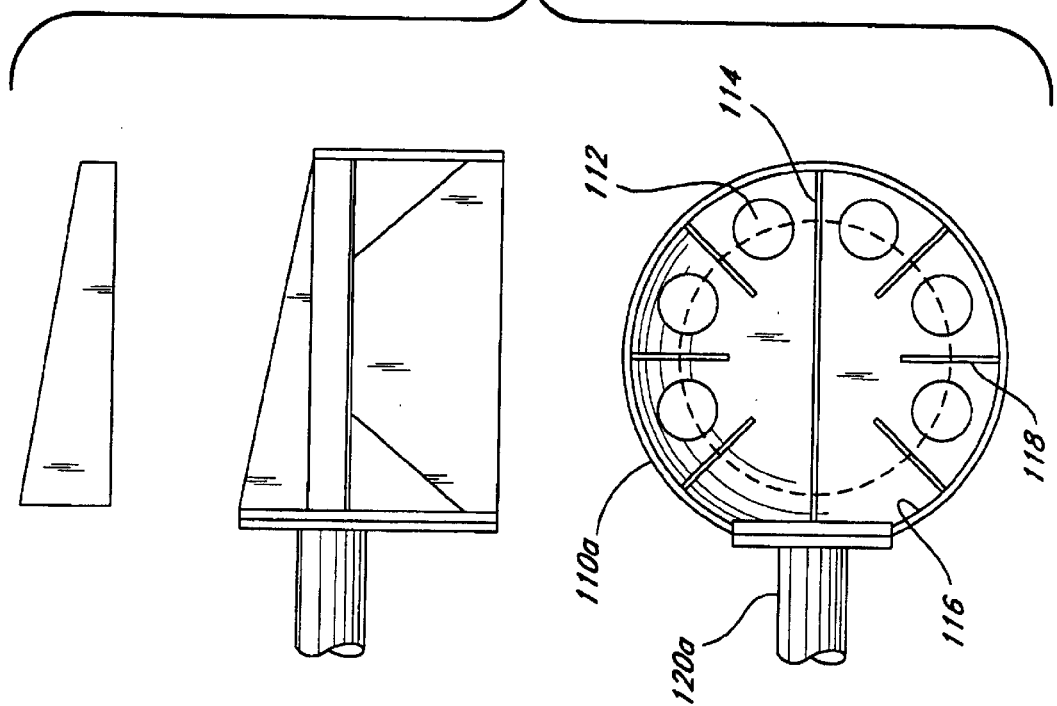
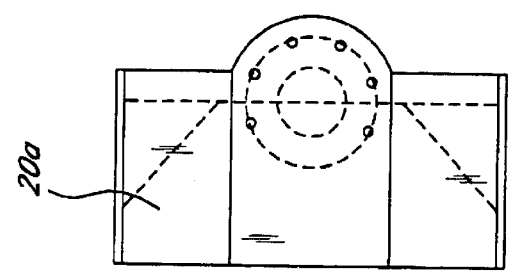
FIG. 7

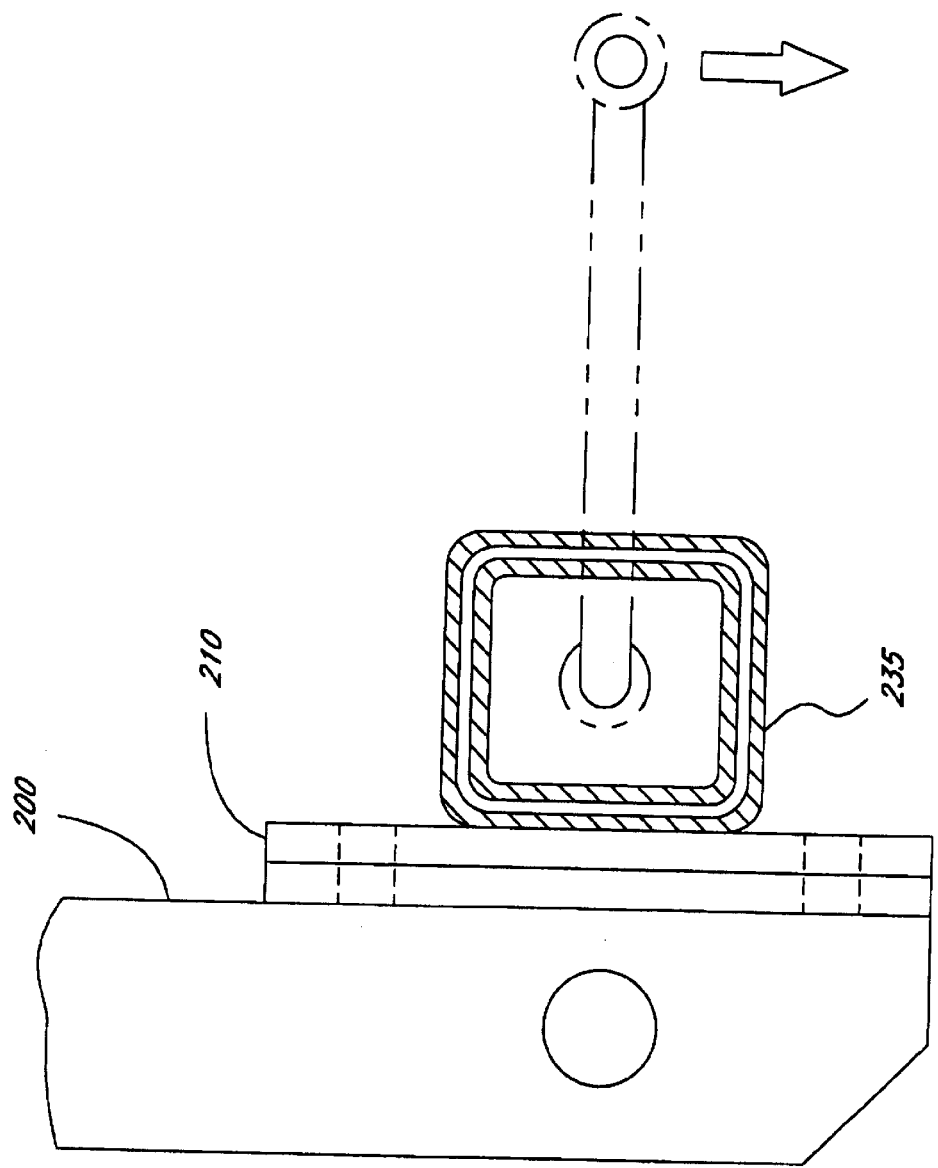

METHOD FOR INSTALLING AND REMOVING A CONTINUOUS TRACK DRIVE UNIT

This application is a divisional of application Ser. No. 09/809,842, filed Mar. 3, 2001, now U.S. Pat. No. 6,654,994.

BACKGROUND OF THE INVENTION

1. Field of Invention

The present invention relates to hoisting and handling systems and methods. More particularly, the present invention relates to a system and method to facilitate the hoisting, positioning, installation and removal of continuous track drive units.

2. Description of Prior Art

Continuous track drive units are used in many types of vehicles and machinery including tractors, construction equipment, and military vehicles. Because continuous track drive units have no beginning or end, installation is often difficult and cumbersome given the need for precise positioning and alignment with respect to the vehicle hubs. Furthermore, because continuous drive track units are not stretchable, the continuous track drive unit must be held taut and in a configuration nearly identical to that of an installed track prior to installation. Such requirements add greatly to the difficulty in installing and removing continuous track drive units.

Another consideration is the weight of the continuous track drive unit. Often, track drive units are constructed with closely spaced steel cables running parallel to the circumference. The steel cables are sheathed in a cast tread, while rubber cogs are cast into the inside circumference to keep the continuous track drive unit captive and centered on its support and drive idlers. These components render continuous track drive units heavy and awkward to manipulate. Nonetheless, these limitations must be overcome when continuous track drive units are installed on vehicles.

Continuous track drive units are commonly shipped positioned on their sides in closely fitted crates. It is advantageous to remove the continuous track drive unit without damage to the unit itself or to the crate. However, using presently available methods, removal of the continuous track drive unit is typically accomplished using multiple chains or wire rope or synthetic slings, and considerable physical strain is required to position these around the track, before it can be lifted from its crate with a suitable hoist. Tong style gripping clamps may also be used to grip the track, thereby eliminating the strain of manipulating the track over chain or sling rigging. Because the purpose of this style clamp serves is very specialized, these clamps are not readily available in the field. Furthermore, the balancing of stresses applied to multiple clamps by the manner in which they are rigged to the hoisting device is easily misjudged, increasing the risk of damaging the track. A method is clearly needed, which this invention provides, to securely and quickly lift the continuous track drive unit from its crate, to even begin dealing with it, that offers no potential injury to the operator, the track or its shipping crate.

Indeed, because continuous track drive units are so heavy, they can be damaged by their own weight if they are lifted improperly. Improper lifting can give rise to a stress point, and ultimately a stress concentration factor, at the point where the continuous track drive units are lifted. Furthermore, internal damage to the continuous track drive units can occur which are not visible to the eye, thereby creating further problems.

By far the greatest difficulty in handling continuous track drive units is during the installation of the track to a vehicle. Presently, rigging used to support and maneuver continuous track drive units is often inadequate because overhead clearance at multiple lift points is obstructed by the vehicle's superstructure and other objects. Further, because vehicle track frames can be displaced only to a small increment, the continuous track drive unit must be installed in a nearly taut position prior to being placed over the idlers. Because there is no single point of balance and no inherent ability to stretch a track over the machine idlers, much time and effort is lost in attempting to lever the track onto the idlers, and the risk of injury to the operators is greatly increased. Further, such methods do not control sagging of the continuous track drive unit which binds and drags on every surface with which it comes in contact.

Yet another problem occurs when continuous track drive units are removed from the vehicle idlers. In order to facilitate removal, vehicle idlers can be displaced somewhat in order to loosen the tension of the track. The end idlers are composed of an inner and outer half, separated by a gap in which the cogs that are integrated into the inner surface of the track run captive, preventing lateral movement of the track on these idlers. The outer end idler halves are removed from the vehicle in order to free the track cogs during removal of the continuous track drive unit. Nonetheless, the weight of the track on the idlers often resists removal. Furthermore, at this point, it is difficult, to near impossible, to attach rigging to support the track such as chain, band slings, forklift tines or gripping clamps. Therefore, at that phase of removal, the track must be pulled and pried off the machine idlers by workers, thereby slowing down and complicating the process, to say nothing of the potential for human injury.

In view of the foregoing, there is a need for a method that overcomes the deficiencies in the prior art.

SUMMARY OF THE INVENTION

The present invention is a system and method to install and remove continuous track drive units on vehicles such as tractors, construction machinery and military vehicles. The present invention overcomes the problems associated with installation and removal of continuous track drive units including track damage, installation and removal speed, worker's safety, and other collateral damages.

The present invention duplicates the shape and tensioning of the vehicle track frame to which the track will be installed. Two forcing discs, connected hydraulically, mimic the shape of the vehicle end idlers. A hydraulically actuated telescopic separator is positioned between the forcing discs, such that the discs may be separated or brought together. After aligning the forcing discs with the vehicle idlers, the continuous track drive unit may be easily slipped onto the vehicle idlers. The use of forcing discs of a diameter slightly larger than that of the vehicle end idlers facilitates the track installation operation by reducing friction between the track held taut on the present invention and the vehicle end idlers in their slack position.

Conversely, when removing continuous track drive units, the forcing discs are again aligned with the vehicle end idlers, and the track is slipped off the vehicle idlers and onto the forcing discs. The use of forcing discs somewhat smaller than the vehicle idlers is not necessary during the removal process, because clearance is developed on the low side of the track as the vehicle frame is detensioned, and the track sags away from the vehicles end idlers downward. This clearance created by gravity and the weight of the track is adequate to insert the present invention, in its slack state, into position.

An attachment hook allows the present invention to be positioned and aligned easily, and from one support point. Simply inverting the attachment hook allows the present invention to be used on either side of a vehicle having dissimilar diameter end idlers. Because the present invention can be made with lightweight materials, it not only reduces the time to install or remove a continuous track drive unit, but also reduces the number of workers needed to complete the operation. Indeed, the present invention allows installation and removal of continuous drive track units by only one man, one hoist, and one tool having some balance flexibility, minimal physical risk, minimal damage potential, and maximized speed and safety. Once the continuous track drive unit is removed from the vehicle idlers and onto the forcing discs, the present invention allows the track to be safely supported and easily repositioned.

It is therefore an object of the present invention to provide a new and improved continuous track drive unit installation system and method which has all the advantages of the prior art, yet none of the disadvantages.

It is another object of the present invention to provide a new and improved continuous track drive unit installation system and method which may be easily and efficiently manufactured and marketed.

It is a further object of the present invention to provide a new and improved continuous track drive unit installation system and method which is of durable and reliable construction.

It is even a further object of the present invention to provide a new and improved continuous track drive unit installation system and method which is susceptible of a low cost of manufacture with regard to both materials and labor, and which accordingly is then susceptible of low prices of sale to the consuming public, thereby making the present invention economically available to the buying public.

Yet another object of the present invention to provide a new and improved continuous track drive unit installation system and method which can be used with minimal space and effort.

The present invention may be better understood by referring to the following Detailed Description, which should be read in conjunction with the accompanying drawings. The Detailed Description of a particular and preferred embodiment, described below, is intended to be a particular example, and not a limitation.

BRIEF DESCRIPTION OF THE DRAWINGS

The accompanying drawings, which are incorporated in and constitute a part of the specification, illustrate presently known preferred embodiments of the present invention, and together with the preceding general description and the following Detailed Description, explain the principles of the invention.

In the drawings:

FIG. 4 is an exploded view of a preferred embodiment of the present invention.

FIG. 5 is a cross sectional side view of a preferred embodiment of the present invention.

FIG. 7 illustrate the construction of the smaller front forcing disc assembly of the preferred embodiment of the present invention.

FIG. 19 is a cross sectional view of an alternative preferred embodiment of the attachment hook and separator tube assembly of the present invention.

DETAILED DESCRIPTION OF THE INVENTION

Embodiments consistent with the present invention address the need for an efficient method that allows for the quick, convenient and safe installation and removal of continuous track drive units. While the prior art attempts to address this problem, only the present invention provides a system and method that incorporates all the above characteristics. The system and method described herein may be implemented over a variety of platforms. For the description of a particular embodiment is intended only for the purposes of example, and not as a limitation.

Figure 1:
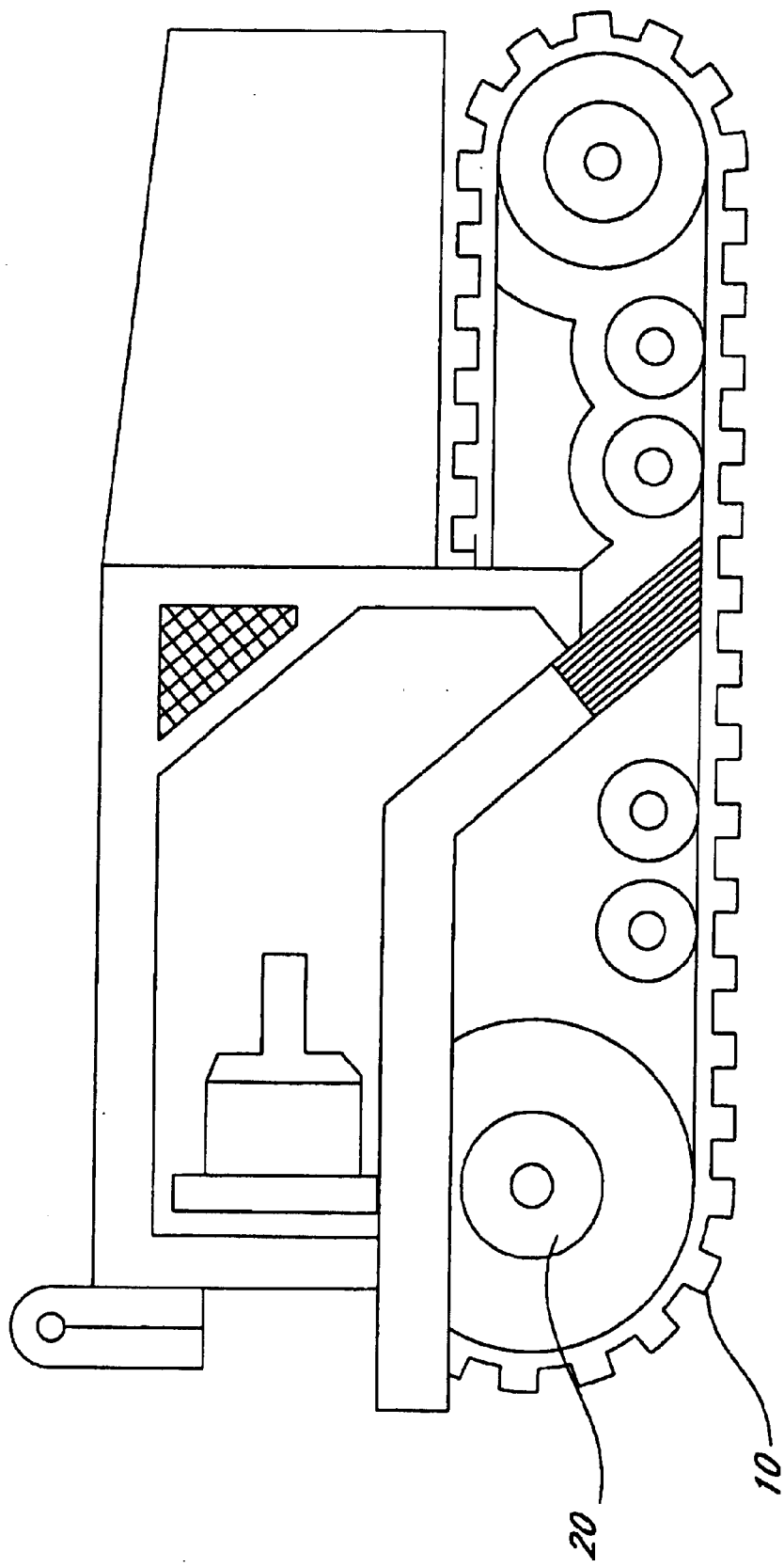
FIG. 1 is a depiction of the vehicle utilizing continuous track drive units.

FIG. 1 is a depiction of a vehicle which uses continuous track drive units. As shown, the continuous track drive unit (10) is tautly installed over one or more vehicle idlers (20).

Figure 2:
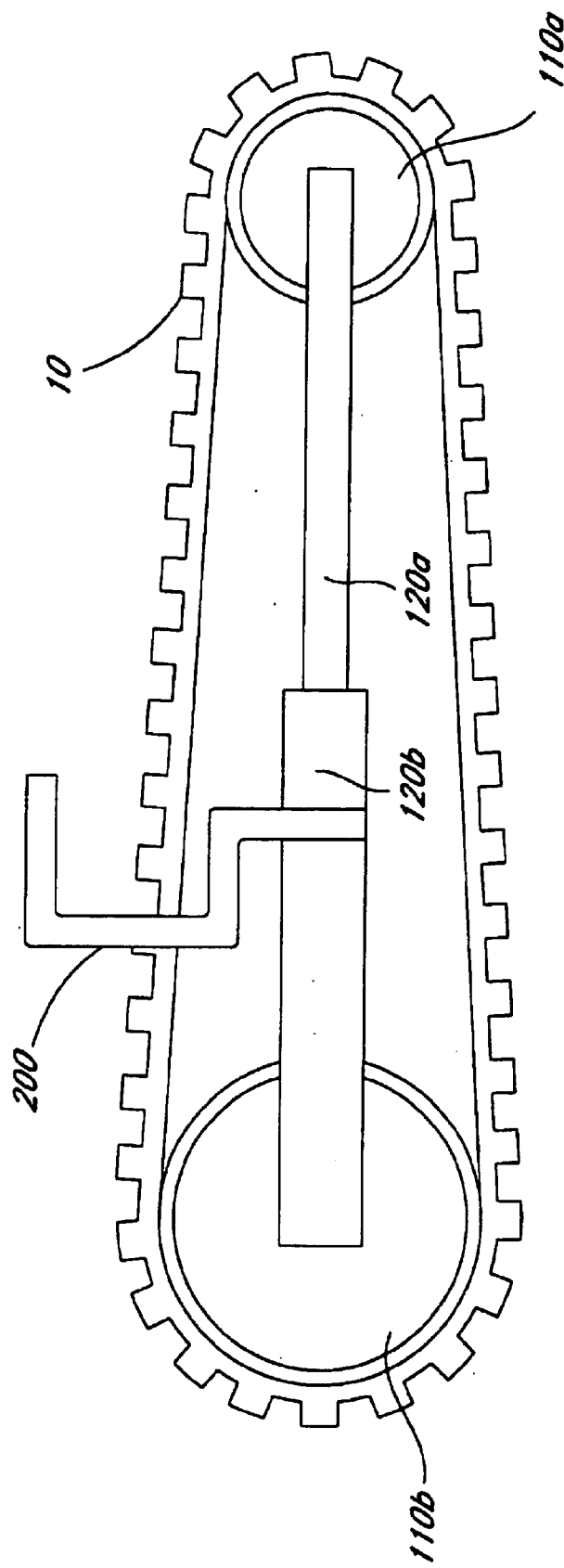
FIG. 2 is a side view of a preferred embodiment of the present invention having a mounted continuous drive unit.

FIG. 2 illustrates the side view of a preferred embodiment of the present invention. A pair of forcing discs (110a, 110b) are mounted to a separator assembly (120a, 120b) allows the forcing discs (110a, 110b) to be neared or separated. In a preferred embodiment of the present invention, the separator assembly is telescopic having an outer member (120b) and an inner member (120a) which travels in and out of the outer member (120b) thereby allowing elongation and contraction. The present invention comprises an attachment hook (200) which is mounted to the outer member (120b) of the separator assembly (120a, 120b). The attachment hook (200) may be inverted so as to accommodate installation or removal of track from either sides of a vehicle having end idlers of dissimilar diameter. For illustration purposes, a continuous track drive unit (10) mounted to the forcing discs (110a, 110b) is illustrated.

Figure 3:
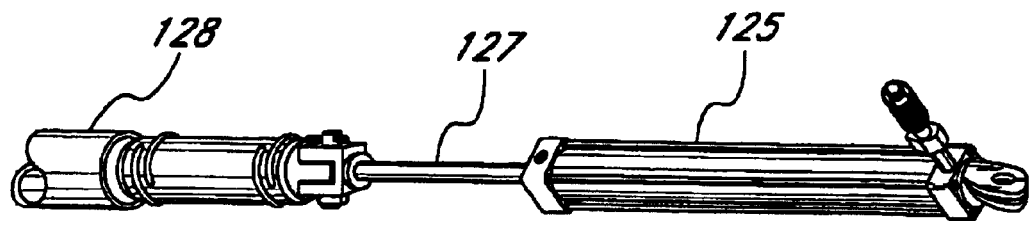
FIG. 3 is a side view of the hydraulic cylinder components, separator assembly and front forcing disc of a preferred embodiment of the present invention.

FIG. 3 illustrates the hydraulic cylinder (125) mounted in connection with a rod (127) and a bushing (128). Activation of the hydraulic cylinder (125) causes the rod (127) and separator assembly (120a) to displace. The bushing on the inner separator assembly (120a), in this example created by wrapping a length of ¼" diameter round rod around the circumference of (120a) at two locations and immovably welding it there, closes the gap between the inner and outer separator assemblies allowing free, but not excessive, play between them. Activation of the hydraulic cylinder (125) causes the rod (127) and the attached separator assembly (120a) to move away from the hydraulic cylinder (125).

Figure 3A:
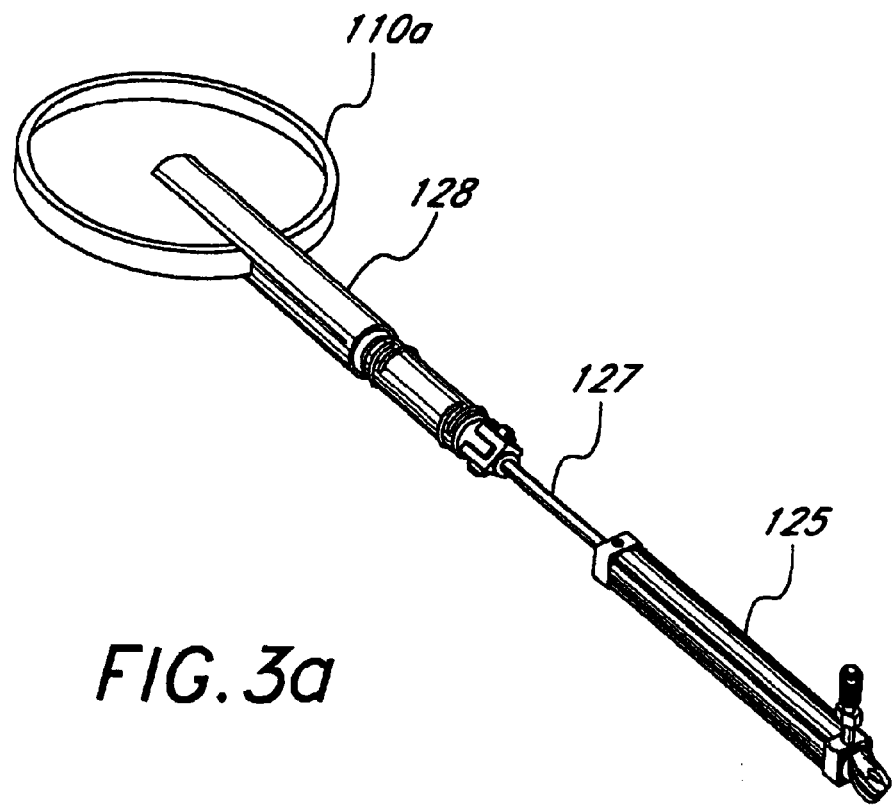
FIG. 3a is a perspective view of the hydraulic cylinder components which act to separate the forcing discs.

FIG. 3a also depicts the hydraulic cylinder (125) connected to the rod (127) and separator assembly (120a) including a bushing (128). A forcing disc (110b) is mounted to the opposite end of the inner member (120a). Accordingly, actualization of the hydraulic cylinder (125) causes the forcing disc (110a) to distance itself.

FIG. 4 is an exploded view of a preferred embodiment of the present invention. The first forcing disc (110a) is immovably connected to the inner member (120a) of the separator assembly (120a, 120b) by a weld. The inner member (120a) is then connected to the rod (127) which is the movable part of the hydraulic cylinder (125). The outer member is designed to accept the hydraulic cylinder (125) with its movable rod (127) and the portion of the inner member (120a) within its confines. The outer member (120b) is likely attached to a second forcing disc (110b) by similar means used on the first forcing disc (110a). A quick connect port (122) is located on the surface of the outer member (120b) to accommodate hydraulic actuation of the internally mounted hydraulic cylinder. The lifting hook plate (210) is mounted to the outer member (120b) to accommodate the attachment of the hook (200). The lifting hook plate (210) is welded to a section of channel iron (215).

FIG. 5 is a cross sectional view illustrating the components of a preferred embodiment of the present invention after assembly. The forcing discs (110a, 110b) are designed to be of a size commensurate with the respective vehicle end idlers (20). After pressure is introduced via the quick connect port (122) the hydraulic cylinder (125) is actuated, thereby actuating the inner member (120a). Accordingly, the forcing discs (110a, 110b) can be separated as desired or brought close together depending on the application.

Figure 6:
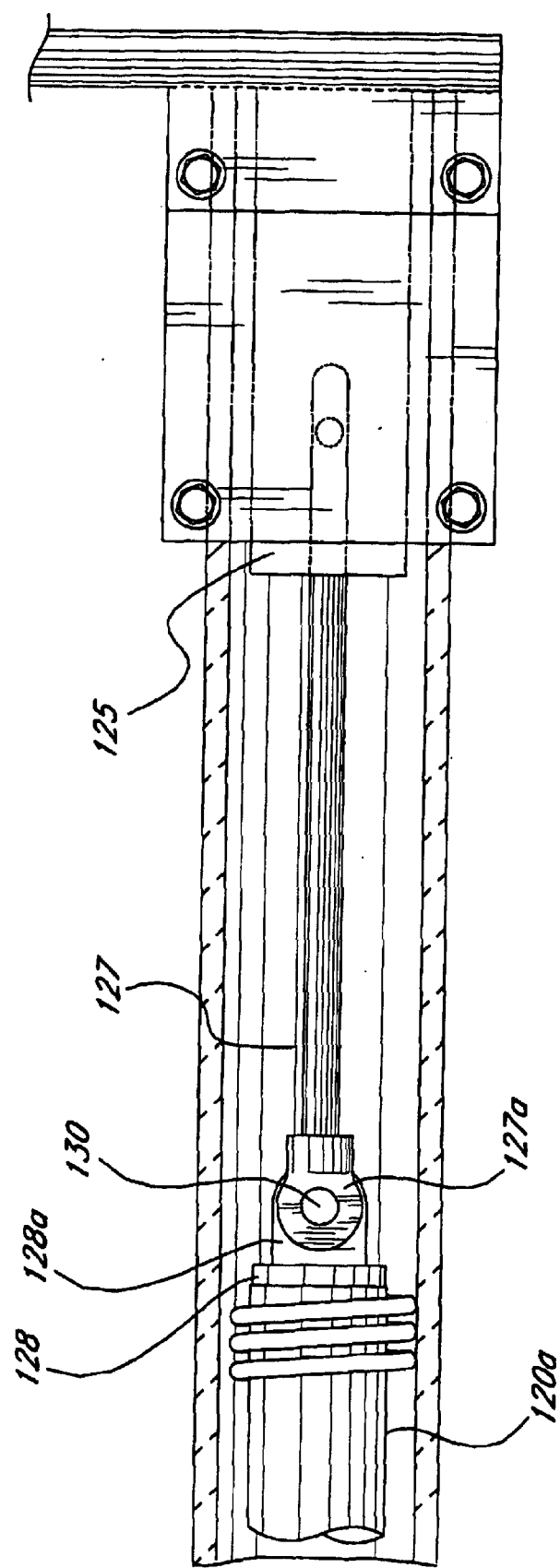
FIG. 6 is a cross sectional side view detailing the relationship of the two separator assemblies to the hydraulic components of a preferred embodiment of the present invention.

FIG. 6 is a detailed cross sectional view of the hydraulic cylinder attachment point at the anti-rotation slot. Once the hydraulic cylinder (125) is actuated, the rod (127) is moved along the path of the slot. The inner separator assembly (120a) is connected to the rod (127) by virtue of a pin (130). The inner separator assembly (120a) has an eye mounting disc (128a) welded to its end, to which a tool eye is formed or welded containing a hold to accept pin (130). In this preferred embodiment, the bushings (128) are located such that they remain within the outer separator assembly (120b) at full hydraulic cylinder rod extension.

FIG. 7 illustrates the preferred embodiment for the forcing discs (110a, 110b). The forcing discs (110a, 110b) are designed with a number of openings (112) positioned such that the worker can see through the forcing discs (110a, 110b) to facilitate the installation and removal process. An external gusset (114) provides a means to offset loads encountered when separating the forcing discs (110a, 110b). The forcing disc band (116) provides the friction surface to grip the track, is supported against compressive loads by gussets (118). Depicted is a forcing disc band (116) which is on the order of two inches wide. However, an alternative embodiment utilizes a forcing disc band (116) on the order of ten inches which provides interference-free offset from the vehicle track frame components. Also shown are the flange components, where the forcing disc band is welded to one flange half, and the separator assembly is welded to the other half. The two flanges are joined by bolts in a preferred embodiment of the present invention, allowing for the removal of the forcing discs (110a, 110b) from their respective separator assemblies to facilitate shipping or local transport.

Figure 8:
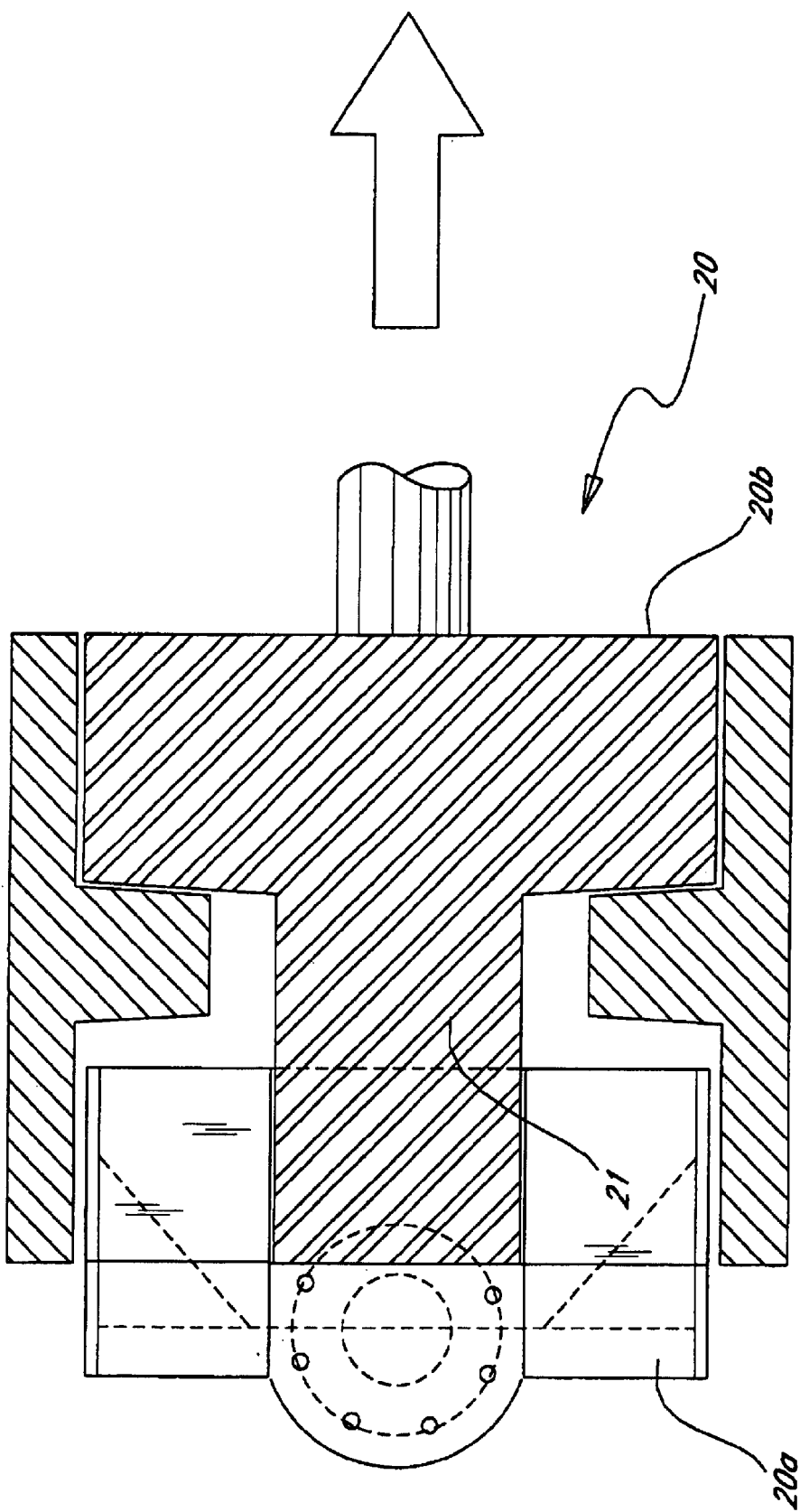
FIG. 8 is a cross sectional view of the front idler of a vehicle utilizing continuous track drive units, and the working position of the invention at that location.

FIG. 8 illustrates the smaller front idler (20) of a vehicle using continuous track drive units (10). The vehicle front idler (20) consists of an outer idler, removed and not shown, coupled to an inner idler (20b) which is attached to and supported by a hub (21). In the installation process, the outer idler is removed from the vehicle and the forcing disc (110a) is positioned in alignment with the remaining hub (21) and inner idler (20b). The continuous track drive unit is then transferred over onto the vehicle inner idler (20b). The outer idler is then reinstalled in its original position. This view shows the reinforcing gussets dimensioned to remain clear of the hub. From this view it can also be visualized that when the inner vehicle idler (20b) is slacked and the invention is tensioned against the continuous track drive unit (10), then the track will be gripped by the invention. Conversely, when the invention is slacked and the vehicle idler bears the weight of the track, friction will keep the track in place on the vehicle inner idler (20b) while the loose invention is removed.

Figure 9:
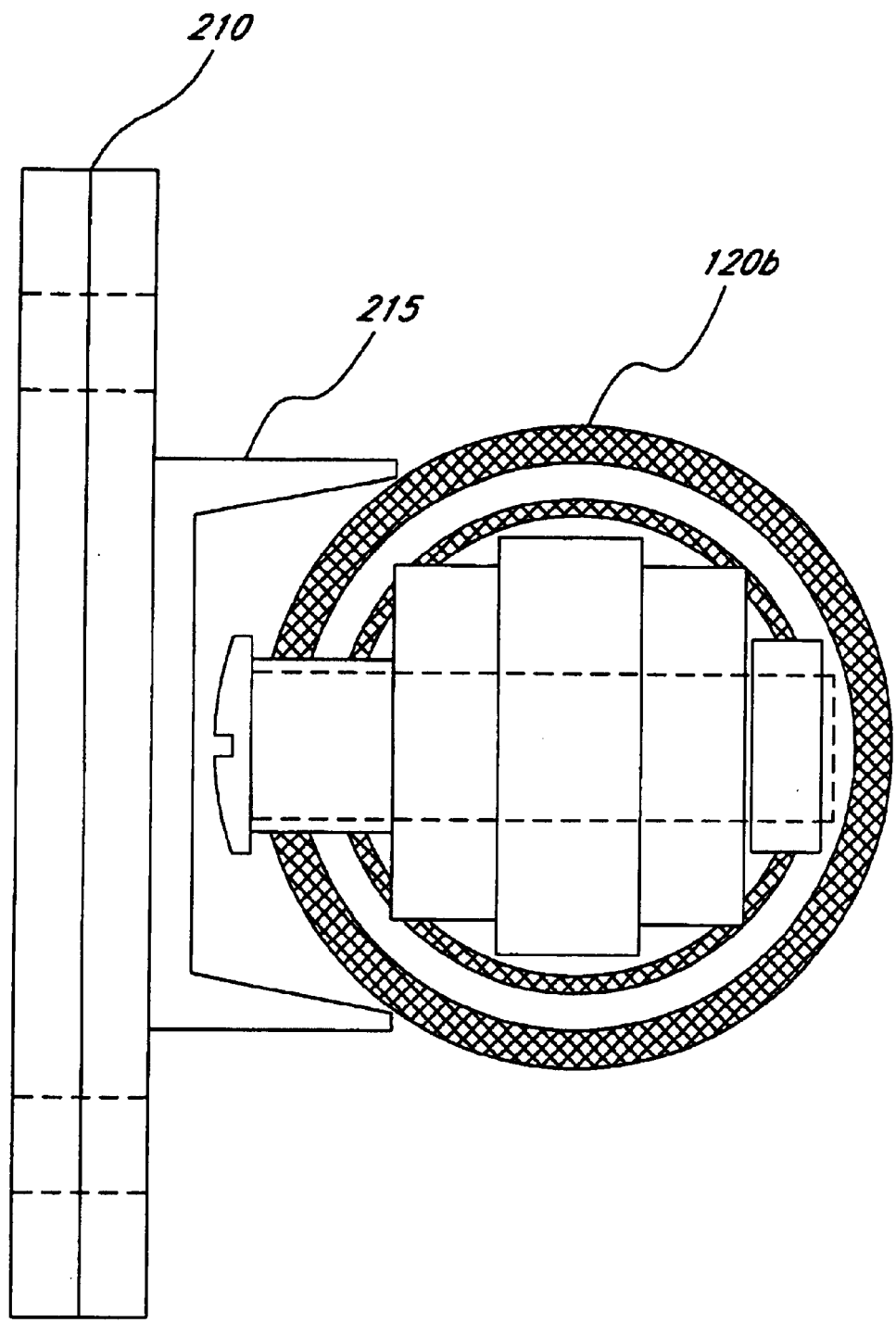
FIG. 9 is a cross sectional longitudinal view of the anti-rotation pin of a preferred embodiment of the present invention.

FIG. 9 illustrates the connection between the separation assembly (120a), the rod yoke (127a) which is the attachment part of rod (127), and the anti-rotation pin (130). This pin extends through a slot cut in the wall of separation assembly (120b), in order to prevent (120a) from rotating within outer member (120b) due to the offset weight load of the continuous track drive unit (10). The attachment hook plate (210a), which is welded to the attachment hook (200) not shown in this drawing, bolts to the attachment hook mounting plate (210). A section of channel iron (215) is immovably welded to the attachment hook mount plate (210). The outer member (120b) is nestled in the channel iron (215) and immovably welded to it. This construction allows for secure but movable mounting of the attachment hook plate (210a) to the outer member (120b) in a secure and unerodable fashion.

Figure 10:
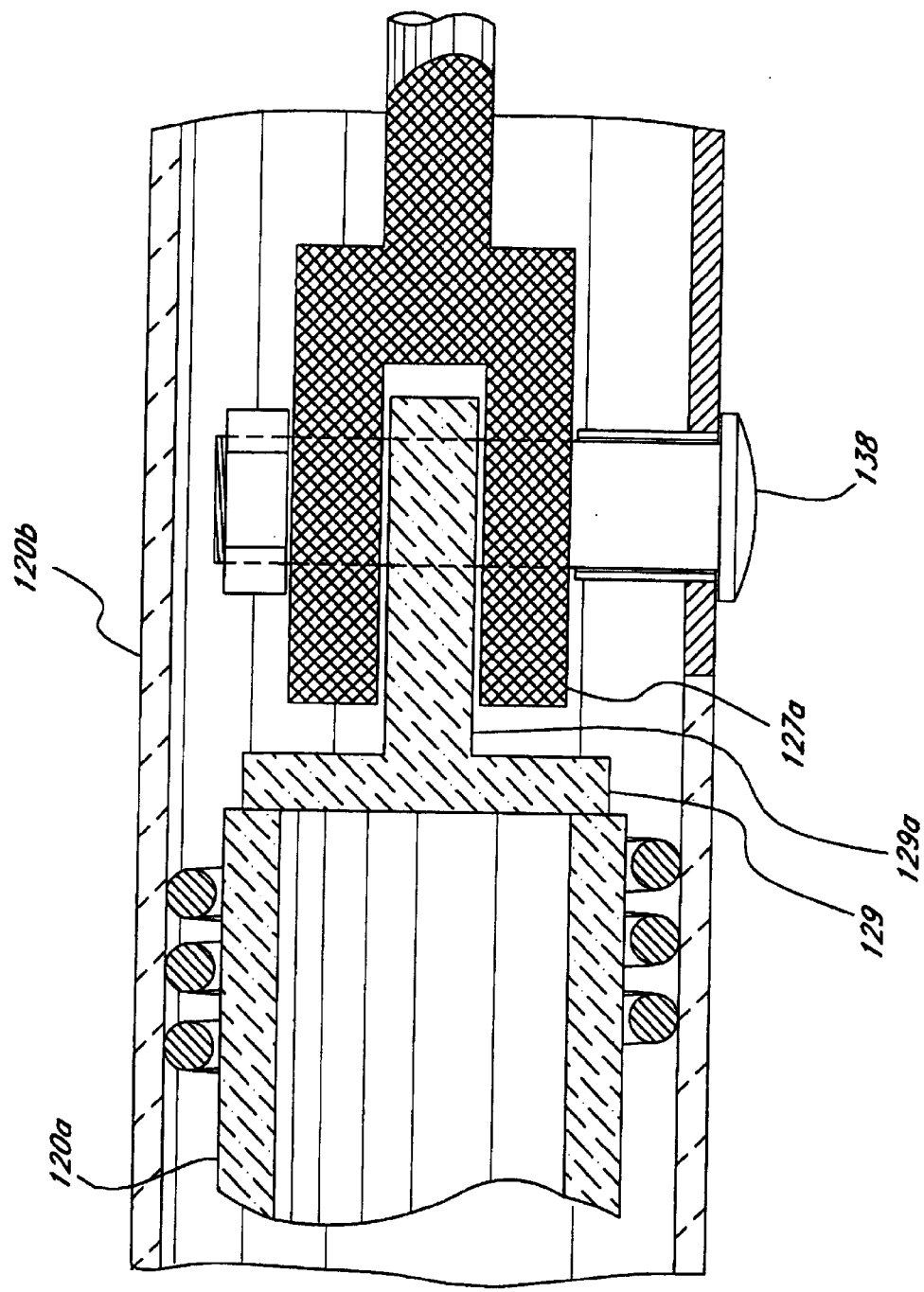
FIG. 10 is a cross sectional plan view of the anti-rotation pin defining its relationship to the two separator assemblies and hydraulic component of a preferred embodiment of the present invention.

FIG. 10 is a detailed cross sectional plan view of the preferred embodiment of the separation assembly (120a, 120b). As is illustrated, the inner member (120a) is inserted into the outer member (120b). An eye mounting disc (not shown) is immovably mounted to the end of the inner member (120a). Likewise, an eyelet (129a) is immovably mounted or formed onto the faceplate (129). The eyelet (129a) is then inserted into the rod yoke (127a) and a pin (130) is introduced thereby securing the connection. Other embodiments connecting the rod (127) to the inner member (120a) can also be used which are known in the art, stipulating that some means must be provided to maintain the vertical relationship between (120a) and (120b) under the offset loads present during use of the invention.

Figure 11:
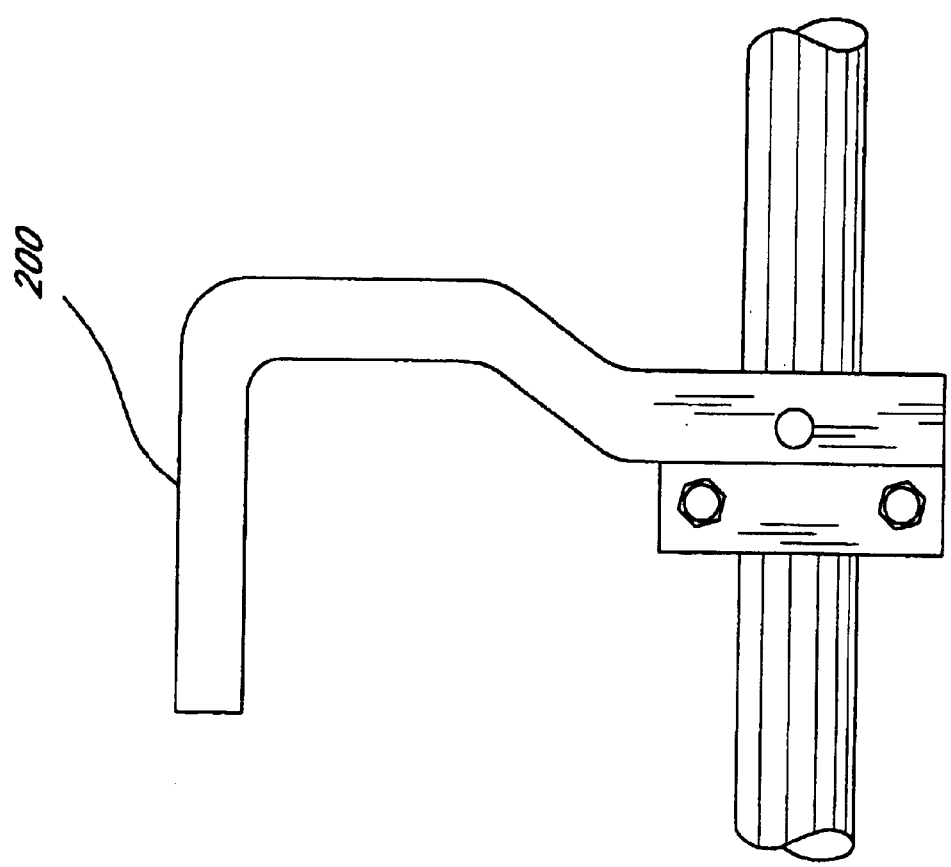
FIG. 11 is a perspective view of the prototype attachment hook of a preferred embodiment of the present invention.

FIG. 11 illustrates the attachment hook (200) used to support the present invention and the continuous track drive unit (10). The attachment hook (200) is securely attached to the outer member (120b) such that manipulation of the hook corresponds to manipulation of the outer member (120b) and therefore to the entirety of the present invention.

Figure 12:
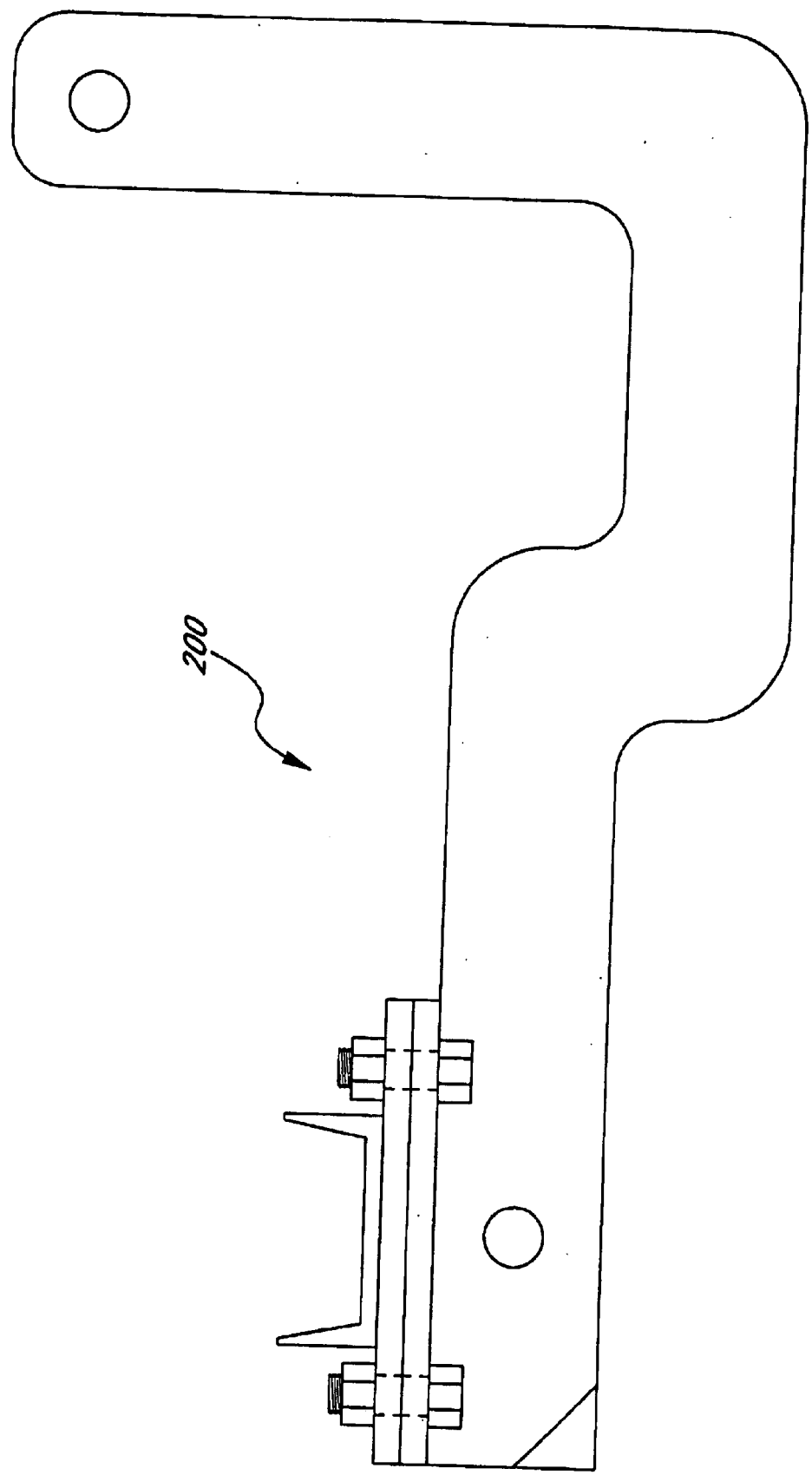
FIG. 12 is the detailed side view of the attachment hook of a preferred embodiment of the present invention.

FIG. 12 illustrates a preferred embodiment of the attachment hook (200) of the present invention.

Figure 13:
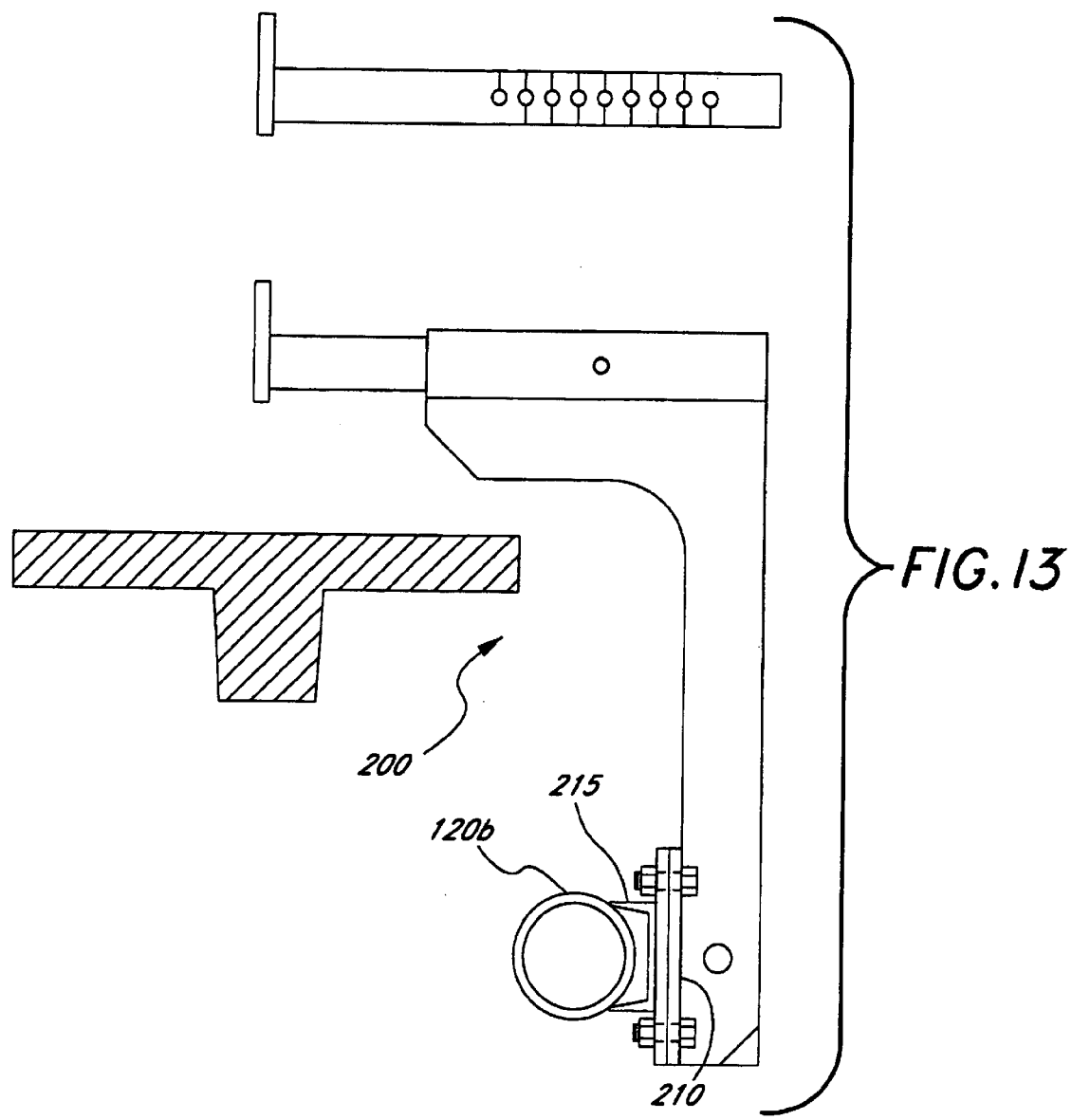
FIG. 13 is the detailed side view of the attachment hook of a preferred embodiment of the present invention, and its working orientation to a sectional view of the top portion of a continuous track drive unit.

FIG. 13 illustrates a preferred embodiment of the attachment hook of the present invention as it attached to the outer member (120b). In this preferred embodiment the attachment hook (200) is comprised of ¾" plate, to the top of which is welded a receiver tube (155a) in the manner of a trailer hitch receiver, with a hole drilled crossways through it for a retaining bolt. This receiver allows various positions of the insert tube (155), to which is welded the lifting eye (157), to be selected. The bottom of attachment hook (200) is welded, perpendicular to the plane of hook (200), to the attachment plate (210). The four-bolt hole pattern of plate (210) matches the three selectable sets of four-bolt hole patterns in hook mounting flange plate (210a). This hook attachment configuration allows some flexibility in adjusting end-to-end balance of the tool/track combination. This makes the present invention useful in applications where the target vehicle is on sloping ground. As discussed in detail previously, the attachment hook plate (210) forms a means to connect the attachment hook (200) to the outer member (120b). The channel iron (215) serves as a means to hold this connection in position without movement or rotation.

Figure 14:
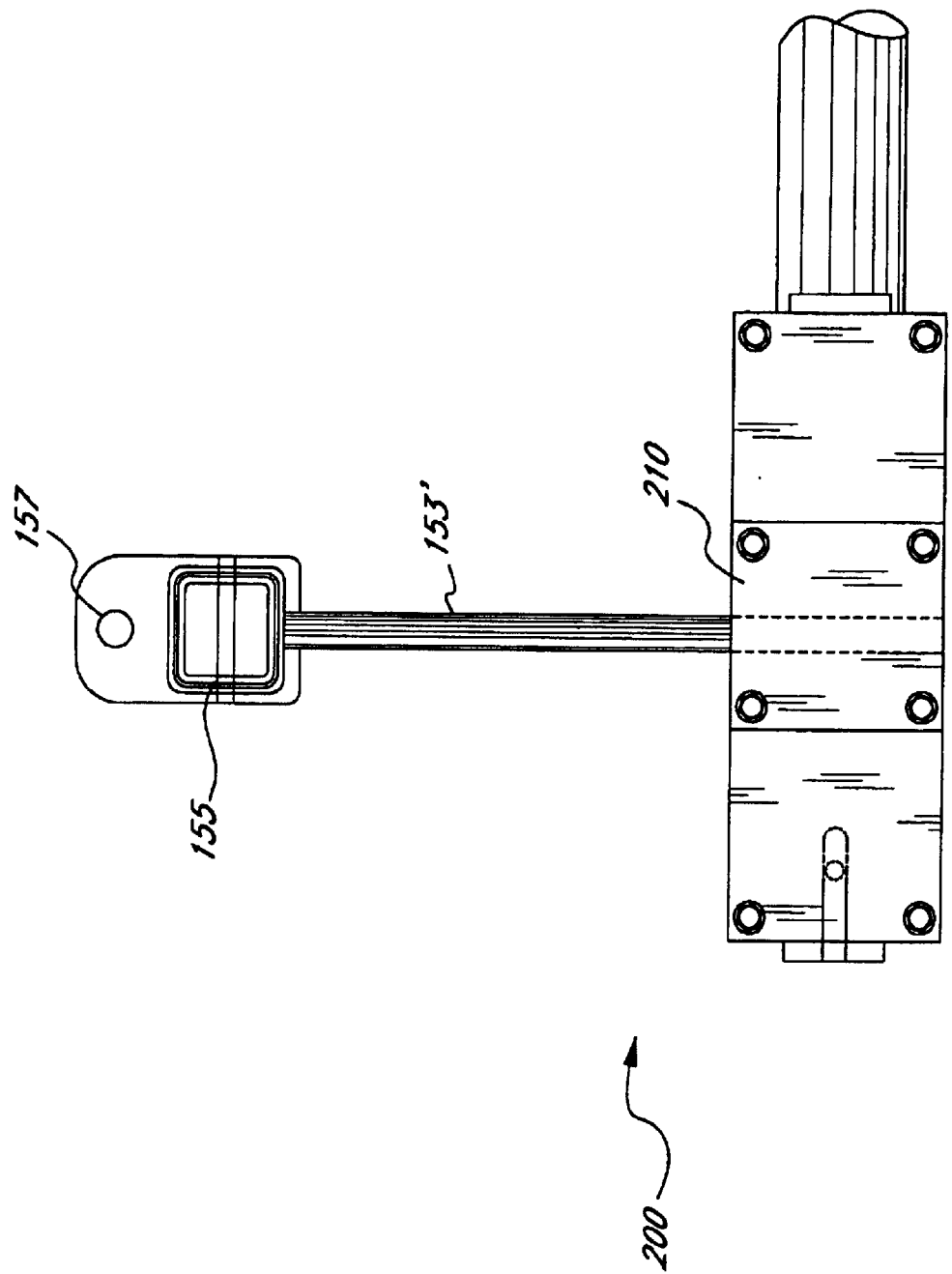
FIG. 14 is a side view of a preferred embodiment of the present invention, detailing the attachment hook area.

FIG. 14 is a detailed illustration of the attachment hook (200) and its immovably affixed mounting plate (210). This view shows that mounting plate (210) can be shifted left to position A or right to position C, providing eight inches of offset to either side of the neutral balance center position B. At the top end of attachment hook (200), a cross sectional view of its immovably affixed receiver tube (155a) is shown. Within this receiver tube, the inner adjustable insert tube (155) is shown. The lifting eye (157), with its single hole for attachment to a suitable lifting device, is shown. This upper assembly provides four inches of offset to either side of the neutral midpoint, in one inch increments, perpendicular to the plane of plates (210, 210a). This arrangement provides the ability to tip the suspended tool/track combination to either side, again for the purpose of accommodating variations in grade or some other perceived advantage of manipulation.

Figure 15:
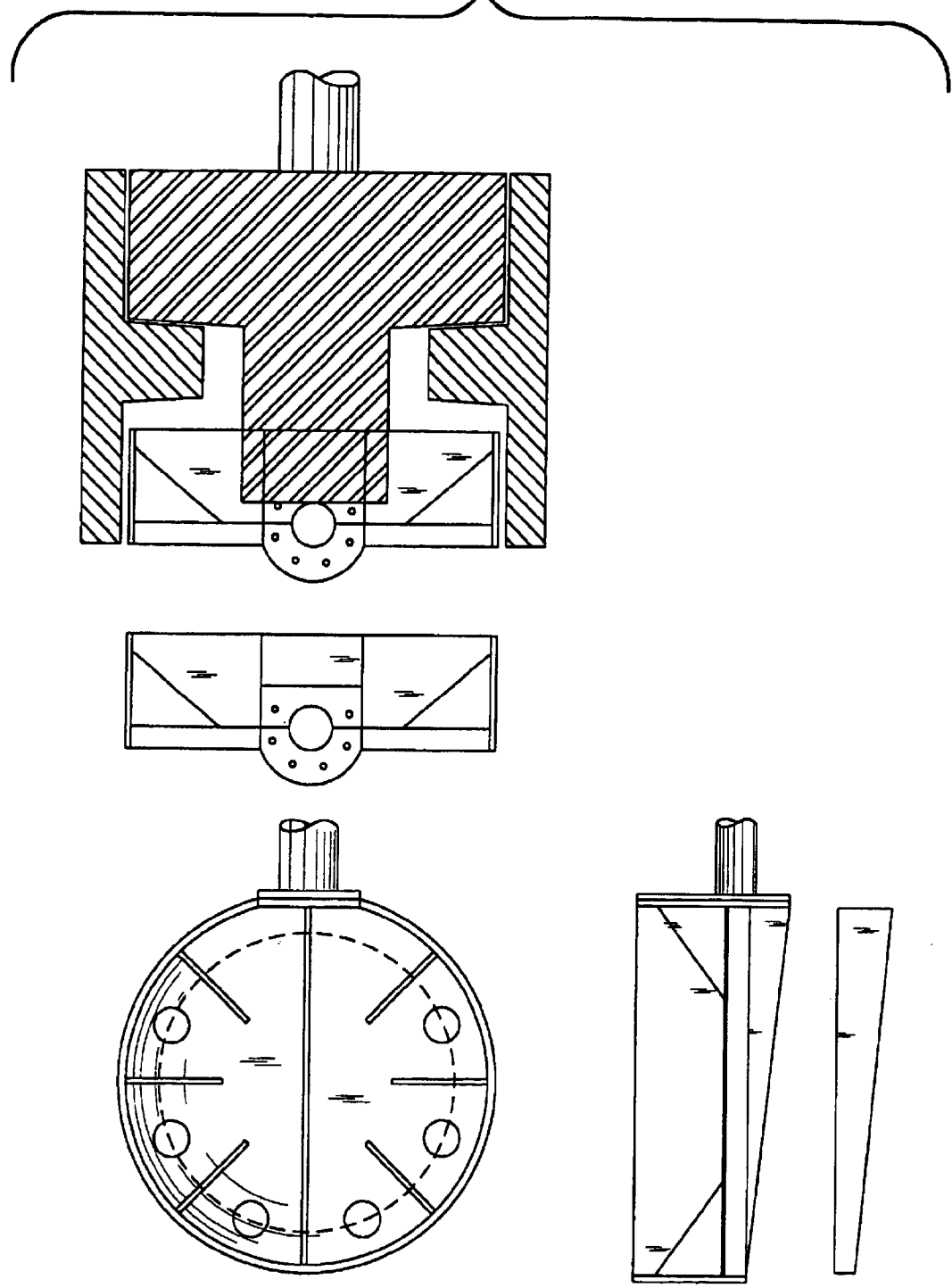
FIG. 15 illustrates various views detailing the construction of the larger rear forcing disc assembly of the preferred embodiment of the present invention.

FIG. 15 offers views like FIG. 7 and FIG. 8 combined, except that dimensions represented reflect the larger diameter of the rear forcing disc (110b).

Figure 16:
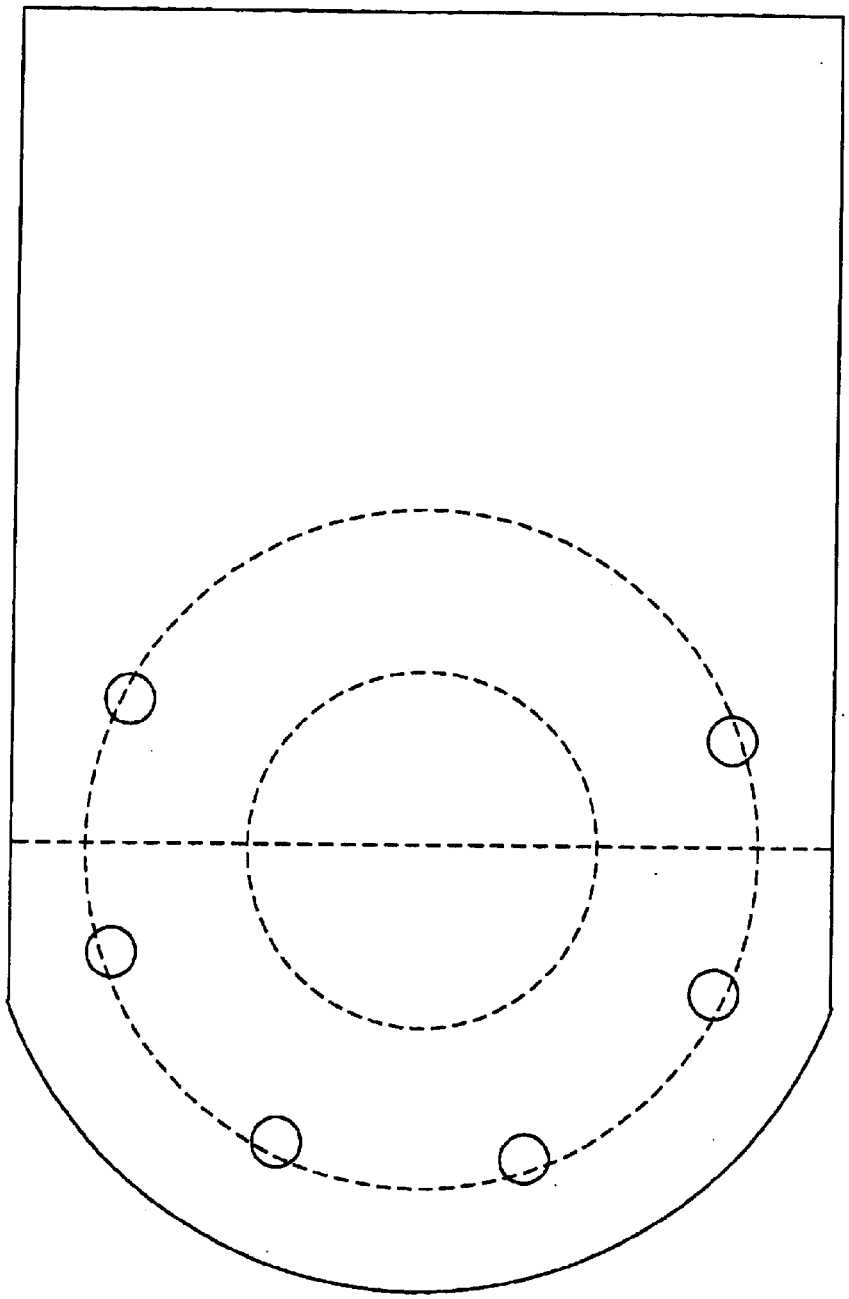
FIG. 16 illustrates dimension details of the four flange plates used to movably join the two forcing disc assemblies to their respective separator assemblies.

FIG. 16 illustrates detailed dimensions of the flange plates used to join forcing discs (110a, 110b) to their respective separator assemblies (120a, 120b). For the forcing discs, the ten inch edges of each flange plate are welded to the ends of the ten inch wide forcing disc bands.

Figure 17:
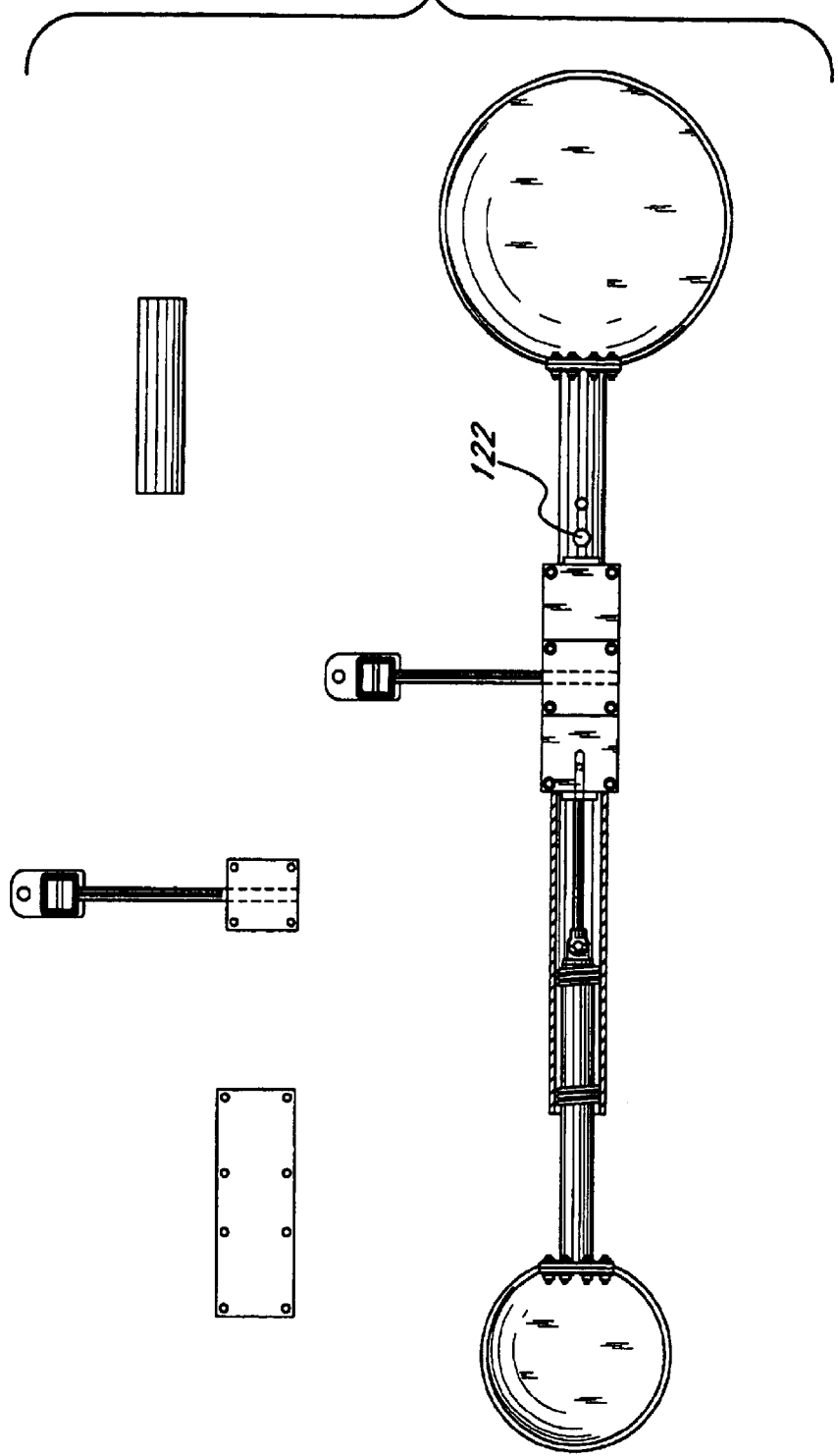
FIG. 17 details dimensioned locations of various components of the preferred embodiment of the present invention.

FIG. 17 specifies dimensions of attachment hook mounting plate (210a) and its dimensioned location on outer member (120b). The dimensioned locations of quick connect port (122) as well as hydraulic cylinder barrel pin (B) are specified on outer member (120b).

Figure 18:
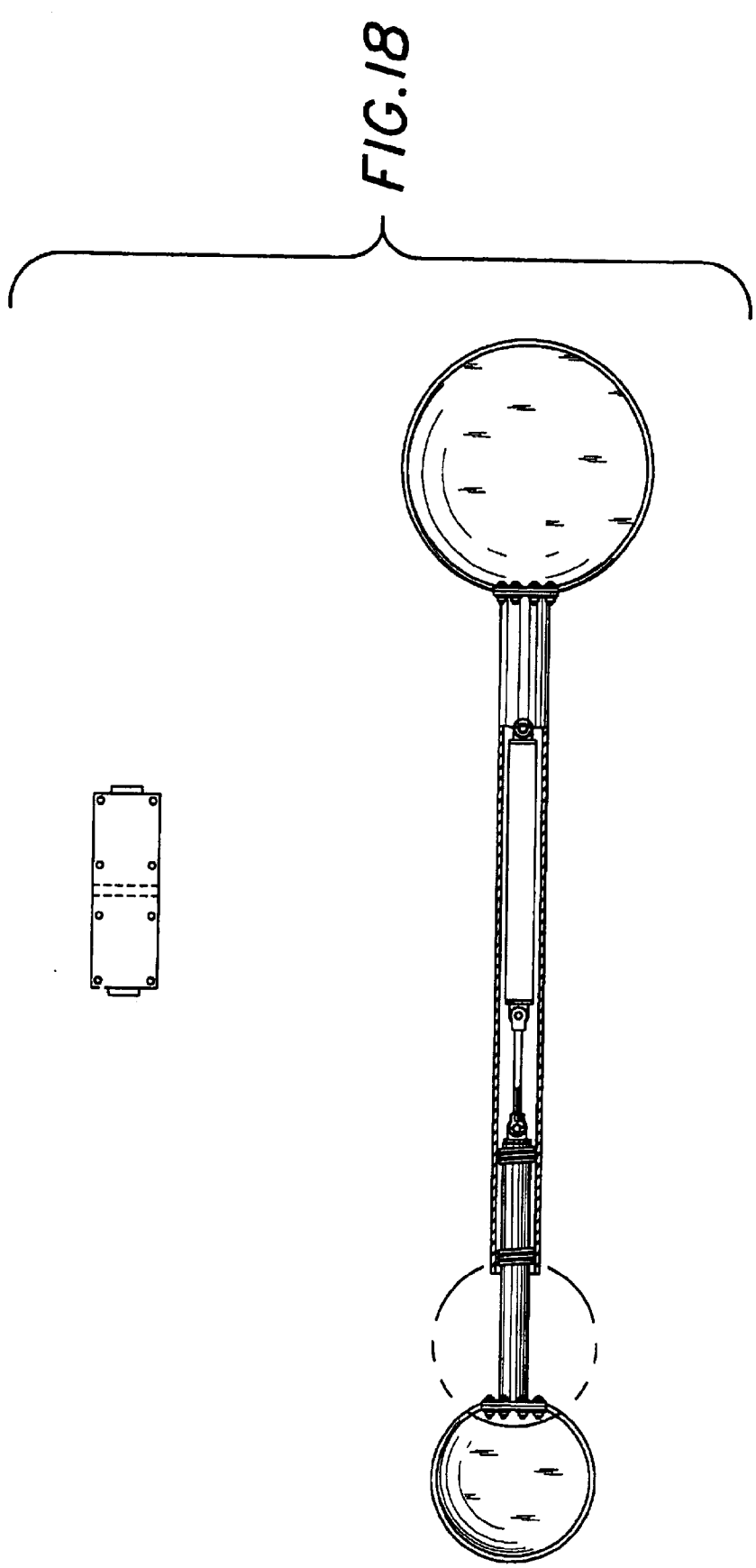
FIG. 18 details dimensions relevant to the range of telescopic extension provided in the preferred embodiment of the present invention.

FIG. 18 specifies dimensions particular to this preferred embodiment of the present invention, including overall length, lengths of members (120a, 120b), and maximum telescopic travel limits.

FIG. 19 illustrates an alternative preferred embodiment of the separator assembly (120a, 120b) of the present invention. The use, for example, of square tube materials (235) eliminates rotation between the inner member (120a) and the outer member (120b). This quality is achieved by virtue of the non-circular cross sectional shape of the inner and outer members (120a, 120b). Accordingly, most non-circular cross sectional shapes can be used to achieve this result. Furthermore, use of such non-circular cross sectional shaped material in the present invention results in simplified and less expensive construction.

We claim:

1. A continuous track drive unit installing and removing method comprising the steps of:
   mounting a continuous track to a pair of forcing discs;
   separating said pair of forcing discs until said continuous track is taut;
   aligning said pair of forcing discs to a vehicle track frame; and
   sliding said continuous track from said pair of forcing discs and onto said vehicle track frame.

2. A continuous track drive unit installing and removing method in claim 1 further comprising the steps of:
   aligning said pair of forcing discs to said vehicle track frame, said vehicle track frame having said continuous track mounted thereon;
   positioning said pair of forcing discs to correspond with said vehicle track frame; and
   sliding said continuous track from said vehicle track frame to said pair of forcing discs.

3. A continuous track drive unit installing and removing method in claim 2 wherein said separating step is accomplished by a separation assembly.

4. A continuous track drive unit installing and removing method in claim 3 wherein said aligning step is accomplished by an attachment hook, said attachment hook connected to said separation assembly.

5. A continuous track drive unit installing and removing method in claim 2 wherein said separating step is accomplished by a separation assembly.

6. A continuous track drive unit installing and removing method in claim 5 wherein said aligning step is accomplished by an attachment hook, said attachment hook connected to said separation assembly.

7. A continuous track drive unit installing and removing method in claim 6 wherein said separation assembly is of telescopic construction.

8. A continuous track drive unit installing and removing method in claim 7 further comprising:
   a hydraulic unit functionally connected to said separation assembly.

9. A continuous track drive unit installing and removing method in claim 6 further comprising:
   a hydraulic unit functionally connected to said separation assembly.

10. A continuous track drive unit installing and removing method in claim 5 wherein said pair of forcing discs are in various sizes in order to accommodate all kinds of vehicles.

11. A continuous track drive unit installing and removing method in claim 5 further comprising:
   a hydraulic unit functionally connected to said separation assembly.

* * * * *